Nov. 29, 1955 T. BRENDEL ET AL 2,724,992
PHOTOGRAPHIC OBJECTIVE COMPRISING THREE AXIALLY
ALIGNED AND AIR SPACED COMPONENTS
Filed April 22, 1952
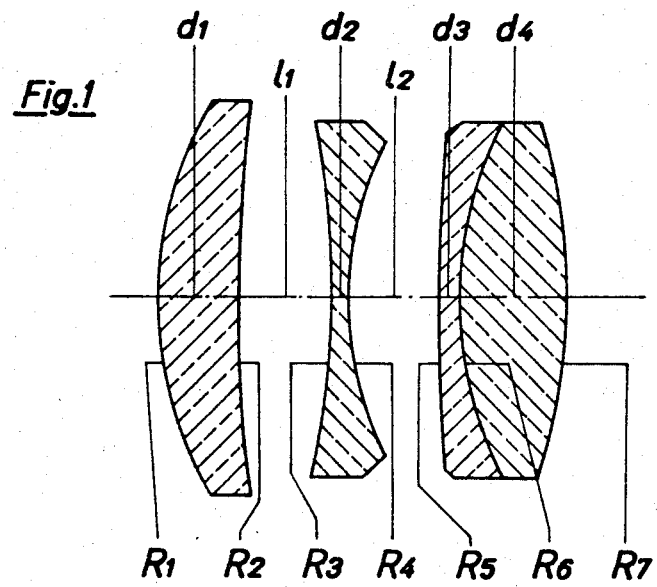
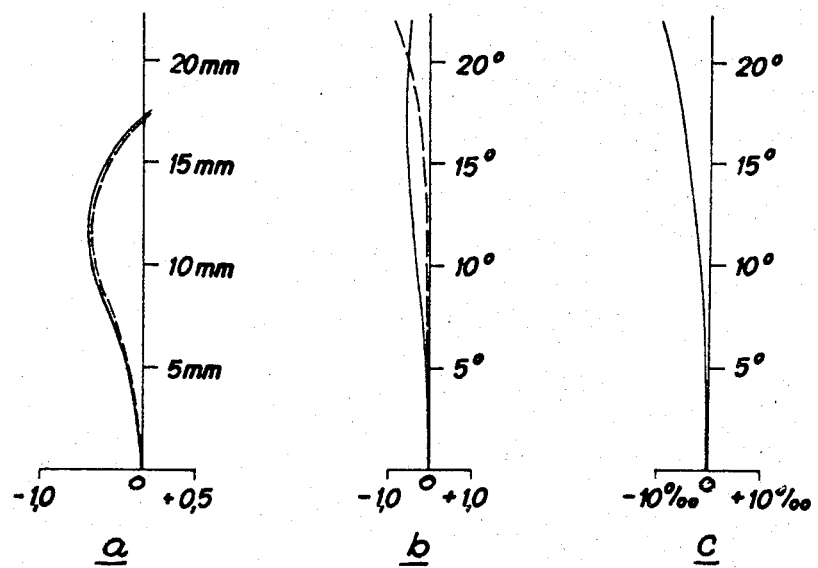
INVENTORS:
THEODOR BRENDEL
HANS LAUTENBACHER
BY Stanley Walder
ATTORNEY.

2,724,992

PHOTOGRAPHIC OBJECTIVE COMPRISING THREE AXIALLY ALIGNED AND AIR SPACED COMPONENTS

Theodor Brendel and Hans Lautenbacher, Munich, Germany, assignors, by mesne assignments, to Agfa Camera-Werk Aktiengesellschaft, a corporation of Germany Application April 22, 1952, Serial No. 283,614

Claims priority, application Germany June 9, 1951

7 Claims. (Cl. 88—57)

This invention relates to a photographic objective of extreme aperture of the type which is corrected for spherical, comatic, astigmatic and chromatic aberration, for field-curvature and distortion and which has three components separated from one another by air spaces, these components being so arranged that a divergent, biconcave single element is bounded by two convergent components, of which the so-called front lens is a single element and the back or rear lens is a biconvex cemented component constituted by a divergent and a convergent portion, which latter component contains a convergent convex cemented surface directed towards the interior of the objective.

More specifically, this invention is concerned with objectives of the known type described above in which the arithmetic means of the refractive indices ($n$) of all glasses, with respect to the D-line of the spectrum (587.6 m$\mu$), is greater than 1.66, the refractive index of the convergent single element, and also of the convergent portion of the cemented component, amounting to at least 1.69, while the refractive index of the divergent single element is at the most 0.05 greater than that of the divergent portion of the cemented component, and in addition the difference between the refractive indices at the cemented surface is less than 0.12.

The present invention is concerned with the provision of objectives of the described type, in the case of which, in contradistinction to known objectives, even for a relative aperture of 1:2.8 and above and also for a field of 45–50°, such as is required for example for the standard type of lens of a miniature camera, the correction of aberrations, primarily in regard to aperture aberration, is carried to such an extent that even with full aperture a satisfactory image can be obtained over the whole field.

This result is achieved according to the present invention by the application of glasses of high refraction corresponding to the above described combination, both surfaces of the converging single element being convex with respect to light which is incident in the direction of the photographic exposure, the radius of curvature of the external surface ($R_1$ of the accompanying drawing, see below) being greater than 0.35 times the focal length ($f$) of the objective, but not exceeding 0.45 times the said focal length, and at the same time ranging between 0.1 and 0.2 times the radius of curvature of the second surface ($R_2$), that the axial separating distances ($l_1$) between the two single elements is at least 0.2 times but not more than 0.3 times the overall length of the objective unit (the sum of all the axial thicknesses and separating distances), but that this latter length, for reasons of edge brightness, amounts, at the most, to 1.26 times the effective diameter of aperture ($\phi$) corresponding to the largest diaphragm opening but being greater than 0.9 times the said diameter, while the axial thickness ($d_1$) of the convergent single element ranging between 0.7 and 0.95 times the separating distance ($l_1$) between the two single elements, and that in addition the absolute value of the radius of curvature of the surface ($R_3$) of the divergent single element directed towards the convergent single element, amounts to at least 2.2 times the effective aperture diameter corresponding to the largest diaphragm opening but does not exceed 2.9 times the said diameter. The effective aperture diameter corresponding to the largest diaphragm opening is given by the quotient $$f/B$$

in which f is the focal length of the objective and B the largest diaphragm opening. If, for example, the focal length of the objective $f=100$ and the largest diaphragm opening $B=2.8$, then the figure for $$\phi = \frac{100}{2.8} = 35.714$$

By choosing the above mentioned means it is possible to keep the fractions of spherical aberration at the individual surfaces and thus the spherical aberration of the objective in general and simultaneously the Petzval-sum small, that thereby a distinct improvement of image quality over the whole field and furthermore due to the small overall-length of the objective a small vignetting are attained.

An especially even correction is attained when the absolute value of the radius of curvature of the surface ($R_5$) of the biconvex cemented component directed towards the divergent single element, ranges between 3.0 and 6.0 times the absolute value of the radius of curvature of the exterior surface ($R_7$).

In the case of an objective constructed in the manner described, in spite of the large relative aperture of 1:2.8 and above, a degree of correction exists which is as good as that obtained in the case of the known objective of similar construction with a relative aperture of 1:3.5. This fact is the more remarkable since there is concerned in this case a type of objective which is relatively simple from the point of view of factory processing.

The above described conditions are mathematically expressed by the customary formula representation as follows:

I. As regards the necessary conditions.
II. As regards the optional characteristics.

I. (1) $0.35\ f \leq R_1 \leq 0.45\ f$
$0.1\ R_2 \leq R_1 \leq 0.2\ R_2$ (2) $0.2\epsilon(d+l) \leq l_1 \leq 0.3\epsilon(d+l)$
$0.9\phi_1 < \epsilon(d+l) \leq 1.26\phi_1$
$0.7l_1 \leq d_1 \leq 0.95l_1$ (3) $2.2\phi_1 \leq |R_3| \leq 2.9\phi_1$ II. (4) $3.|R_7| \leq R_5 \leq 6.|R_7|$ Therein f means the focal length of the objective, R the radii of curvature, d the axial thicknesses, l the axial airspaces, $\phi$ the effective diameter corresponding to the largest diaphragm opening, $\epsilon$ $(d+l)$ the overall-length of the objective. The indices (1, 2 . . . .) are counted in the direction of indicent light with respect to photographic exposure.

The invention is illustrated in the accompanying conventional drawing when considered in conjunction with the following tables in which the reference notation of the drawing is interpreted.

Fig. 1 is a sectional view of an objective made in accordance with the subject invention for a focal length of F=200 mm.

Fig. 2 comprises a set of correction curves in the customary method of representation ($a$) showing the curve for spherical aberration and sine condition, ($b$) showing the curve for astigmatism, ($c$) showing the curve for distortion.

The numerical data given in the tables apply to an objective of a focal length f=100. The relative aperture is 1:2.8.

As may be observed from Fig. 1 the component lens elements therein set forth, reading from left to right, that being the direction of the incidence of light thereon, consist of a convergent convexo-concave front element having an axial length designated $d_1$, a front surface radius of curvature designated $R_1$ and a rear surface radius of curvature designated $R_2$ supported by a distance designated $l_1$ from a middle concavo-concave divergent component having an axial length $d_2$ and a front surface radius of curvature designated $R_3$ and a rear surface radius of curvature designated $R_4$, which in turn is supported by a distance $l_2$ from a convergent convexo-convex rear component consisting of a divergent front portion and a convergent rear portion, the front portion being a convexo-concave portion having an axial length $d_3$, a front surface radius of curvature designated by $R_5$ and a rear surface radius of curvature designated $R_6$, which said designation $R_6$ also denotes the radius of curvature of the front surface of the rear portion of said rear component, said rear portion being a convexo-convex portion having an axial length of $d_4$ and a rear surface radius of curvature designated by $R_7$.

In the tabular examples which follow, which contain the numerical data for an objective of the focal length $f=100$, the notation for the successive radii of curvature is listed as $R_1$, $R_2$ etc., the thicknesses of the individual elements along the axis as $d_1$, $d_2$ . . . and the air spaces along the optical axis as $l_1$, $l_2$ . . . The tables also give the refractive indices $n_1$, $n_2$ . . . for the glasses used and their Abbé-numbers $V_1$, $V_2$ . . .

Example 1

[$f=100$]

| Radii | Thicknesses and separating distances | Glasses | |
|---|---|---|---|
| | | $n_D$ | V |
| $R_1=+ 37.3$ | $d_1= 7.5$ | 1.69090 | 54.8 |
| $R_2=+305.0$ | $l_1= 8.6$ | | |
| $R_3=- 83.8$ | $d_2= 1.6$ | 1.64611 | 34.0 |
| $R_4=+ 33.5$ | $l_2= 8.9$ | | |
| $R_5=+316.0$ | $d_3= 1.4$ | 1.60323 | 42.5 |
| $R_6=+ 37.2$ | $d_4=10.0$ | 1.71700 | 47.9 |
| $R_7=- 56.225$ | | | |

Example 2

| Radii | Thicknesses and separating distances | Glasses | |
|---|---|---|---|
| | | $n_D$ | V |
| $R_1=+ 37.5$ | $d_1= 7.5$ | 1.69347 | 53.5 |
| $R_2=+294.043$ | $l_1= 9.0$ | | |
| $R_3=- 90.0$ | $d_2= 1.6$ | 1.66680 | 33.1 |
| $R_4=+ 34.15$ | $l_2= 8.8$ | | |
| $R_5=+218.0$ | $d_3= 2.0$ | 1.65128 | 38.3 |
| $R_6=+ 36.5$ | $d_4=11.5$ | 1.74400 | 44.7 |
| $R_7=- 60.532$ | | | |

Although the subject invention has been described with a certain degree of particularity, it is understood that the present disclosure has been made only by way of example and that numerous additions and changes in the details of construction, combination and arrangement may be resorted to without transcending the scope of the invention as hereinafter claimed.

What is claimed is:

1. A photographic objective comprising three axially aligned components of optical glass, the arithmetic mean of the refractive indices of all glasses being greater than 1.66, the front component being a convergent convexo-concave single element, the radius of curvature of the front face thereof being greater than 0.35 times, but not more than 0.45 times the focal length of the objective and greater than 0.1 times the radius of curvature of the rear surface of said element, the middle component being a divergent concavo-concave single element, the radius of curvature of the front surface of said middle component being at least 2.2 times the effective aperture diameter corresponding to the largest diaphragm opening of the camera with which said objective is used, and the rear component being a convexo-convex element consisting of a divergent front portion and a convergent rear portion, the front surface of said rear portion being convex and cemented to the registering rear surface of said front portion, the refractive index of said middle component being not more than 0.05 times greater than the front portion of said rear component, the difference between the refractive indices of the cemented surfaces of said rear component being less than 0.12, the axial separation of the front and middle components being at least 0.2 times the axial length of the entire objective, but not greater than 1.26 times the said effective aperture diameter corresponding to the largest diaphragm opening of the camera with which said objective is used.

2. A photographic objective comprising three axially aligned and air spaced components and including two outer positive components enclosing a single lens negative middle component, the first or front component being a convergent single lens element and the rear convergent component consisting of a divergent lens portion cemented to a convergent lens portion and with the cemented surface convex towards the interior of the objective, both surfaces of the front convergent single element being convex with respect to the front of the objective, the radius of curvature of the external surface ($R_1$) of said convergent single element being greater than 0.35 times the focal length of the objective, but not exceeding 0.45 times the said focal length, and at the same time ranging between 0.1 times and 0.2 times the radius of curvature of the second surface ($R_2$) front of said convergent single element, the axial airspace ($l_1$) between the two single elements ranging between 0.2 times and 0.3 times the overall-length of the objective, but this latter length, for reasons of edge brightness, not exceeding 1.26 times, the effective diameter ($\phi_1$) of aperture corresponding to the largest diaphragm opening, but being greater than 0.9 times the said diameter, while the axial thickness ($d_1$) of said convergent single element ranging between 0.7 times and 0.95 times the axial airspace ($l_1$), and in addition the absolute value of the radius of curvature of the surface ($R_3$) of the middle component directed toward the said convergent single element amounting to at least 2.2 times but not exceeding 2.9 times the effective aperture diameter ($\phi$) corresponding to the largest diaphragm opening.

3. A photographic objective as claimed in claim 2, in which the radius of curvature of the surface ($R_5$) of the biconvex cemented component directed towards the divergent single element, ranges between 3 times and 6 times the absolute value of the radius of curvature of the exterior surface ($R_7$).

4. A photographic objective comprising three, spaced in air, axially aligned components of optical glass, the arithmetic mean of the refractive indices of all glasses being greater than 1.66, the front component being a convergent convexo-concave single element, the radius of curvature of the front face thereof being greater than 0.35 times, but not more than 0.45 times the focal length of the objective and from 0.1 to 0.2 times the radius of curvature of the rear surface of said element, the middle component being a divergent concavo-concave single element, the radius of curvature of the front surface of said middle component being at least 2.2 times but not exceeding 2.9 times the effective aperture diameter corresponding to the largest diaphragm opening of the camera with which said objective is used, and the rear component being a convexo-convex element consisting of a divergent front portion and a convergent rear portion, the front surface of said rear portion being convex and cemented to the registering rear surface of said front portion, the refractive index of said middle component being not more than 0.05 times greater than the front portion of said rear component, the difference between the refractive indices of the cemented surfaces of said rear component being less than 0.12, the axial separation of the front and middle components being from 0.2 to 0.3 times the axial length of the entire objective, but not less than 0.9 nor greater than 1.26 times the said effective aperture diameter corresponding to the largest diaphragm opening of the camera with which said objective is used.

5. A photographic objective as described in claim 4, the axial thickness of said front component being from 0.7 to .95 times the axial separation of said front and middle components.

6. An optical objective having numerical data substantially as follows:

[Focal length=100  f/2.8]

| Radii | Thicknesses Separating Distances | Glasses | |
|---|---|---|---|
| | | $n_D$ | V |
| $R_1=+ 37.3$ | | | |
| $R_2=+305.0$ | $d_1= 7.5$ | 1.69090 | 54.8 |
| $R_3=+ 83.8$ | $l_1= 8.6$ | | |
| $R_4=+ 33.5$ | $d_2= 1.6$ | 1.64611 | 34.0 |
| $R_5=+316.0$ | $l_2= 8.9$ | | |
| $R_6=+ 37.2$ | $d_3= 1.4$ | 1.60323 | 42.5 |
| $R_7=- 56.225$ | $d_4=10.0$ | 1.71700 | 47.9 | in which $R_1$, $R_2$ ... represent the radii of curvature of the individual lens surfaces, the plus and minus values indicating surfaces respectively convex and concave to the front, $d_1$, $d_2$ ... represent the thickness of the individual lens elements, $l_1$ and $l_2$ represent the air spacing between the lens elements along the optical axis, the subscript numbering proceeding in order from front to rear of the lens system.

7. An optical objective having numerical data substantially as follows:

[Focal length=100  f/2.8]

| Radii | Thicknesses Separating Distances | Glasses | |
|---|---|---|---|
| | | $n_D$ | V |
| $R_1=+ 37.5$ | | | |
| $R_2=+294.043$ | $d_1= 7.5$ | 1.69347 | 53.5 |
| $R_3=+ 90.0$ | $l_1= 9.0$ | | |
| $R_4=+ 34.15$ | $d_2= 1.6$ | 1.66680 | 33.1 |
| $R_5=+218.0$ | $l_2= 8.8$ | | |
| $R_6=+ 36.5$ | $d_3=2.0$ | 1.65128 | 38.3 |
| $R_7=- 60.532$ | $d_4=11.5$ | 1.74400 | 44.7 | in which $R_1$, $R_2$ ... represent the radii of curvature of the individual lens surfaces, the plus and minus values indicating surfaces respectively convex and concave to the front, $d_1$, $d_2$ ... represent the thickness of the individual lens elements, $l_1$ and $l_2$ represent the air spacing between the lens elements along the optical axis, the subscript numbering proceeding in order from front to rear of the lens system.

References Cited in the file of this patent
UNITED STATES PATENTS

| 2,084,714 | Tronnier | June 22, 1937 |
| 2,158,178 | Frederick et al. | May 16, 1939 |
| 2,308,007 | Hergberger et al. | Jan. 12, 1943 |